(12) United States Patent
Brenner

(10) Patent No.: US 6,870,518 B1
(45) Date of Patent: Mar. 22, 2005

(54) CONTROLLING TWO MONITORS WITH TRANSMISSION OF DISPLAY DATA USING A FIFO BUFFER

(75) Inventor: Alfred Brenner, Gauting (DE)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/308,707

(22) PCT Filed: Dec. 3, 1996

(86) PCT No.: PCT/EP96/05381

§ 371 (c)(1),
(2), (4) Date: May 21, 1999

(87) PCT Pub. No.: WO98/25200

PCT Pub. Date: Jun. 11, 1998

(51) Int. Cl.$^7$ ................................................ G09G 5/00
(52) U.S. Cl. ........................ 345/1.3; 345/204; 345/558
(58) Field of Search ............................. 345/1, 196–198, 345/204, 507, 508, 518, 521, 213, 515, 558, 550, 1.3, 257; 348/778, 383

(56) References Cited

U.S. PATENT DOCUMENTS

| | | | |
|---|---|---|---|
| 3,051,779 A | * | 8/1962 | Lakjer .......................... 348/38 |
| 3,289,196 A | * | 11/1966 | Hull ............................. 347/230 |
| 4,760,388 A | * | 7/1988 | Tatsumi et al. ................. 345/1 |
| 5,010,413 A | * | 4/1991 | Bahr ........................... 348/383 |
| 5,138,305 A | | 8/1992 | Tomiyasu |
| 5,488,385 A | | 1/1996 | Singhal et al. |

FOREIGN PATENT DOCUMENTS

| | | |
|---|---|---|
| DE | 44 04 437 A1 | 8/1994 |
| EP | 06006724 | 1/1994 |
| FR | 2 528 604 | 12/1983 |
| WO | WO 88/02162 | 3/1988 |

* cited by examiner

*Primary Examiner*—Alexander Eisen
(74) *Attorney, Agent, or Firm*—Vedder, Price, Kaufman & Kammholz, P.C.

(57) ABSTRACT

A method for controlling two monitors on the basis of an input-side pixel data stream, in which one part of each line of the input-side pixel data stream is displayed on one of the monitors and another part of the line is displayed on another of the monitors, comprises the storing of one part of the line of the input-side pixel data stream in one FIFO memory device and the storing of the other part of the line of the input-side pixel data stream in another FIFO memory device. The readout of one FIFO memory device takes place with the pixel frequency with which one monitor is operated while the readout of the other FIFO memory device takes place with the pixel frequency with which the other monitor is operated. Thus, a moderately priced and high speed monitor control circuit is realized.

12 Claims, 3 Drawing Sheets

CONTROLLING TWO MONITORS WITH TRANSMISSION OF DISPLAY DATA USING A FIFO BUFFER

FIELD OF THE INVENTION

The present invention relates to interfaces between monitors and computers and in particular to the controlling of two monitors on the basis of a pixel data stream.

DESCRIPTION OF BACKGROUND ART

The widespread use of window systems in personal computers and workstations has resulted in a demand for larger monitors so as to be able to represent more windows on a monitor. Although more than 14-inch monitors have become increasingly common recently, this option is exceedingly expensive, since even a relatively small enlargement of the monitor area leads to a considerable increase in the cost of the monitor. A user of window systems requires e.g. for simultaneous working in a text processing system and e.g. in a graphics program or a CAD program several windows on a screen. Because of the size of a screen it is nearly impossible to represent all the necessary windows simultaneously and e.g. to activate one or other of the windows by means of a keyboard or a mouse. The user is thus forced to close some windows and open others when he wishes to change from one application to another. In applications requiring a frequent back and forth between the various windows which represent different applications, the perpetual closing and opening is a tiresome activity, which, for one thing, markedly reduces the user's working efficiency.

For this reason the need arose to connect two or more screens to a personal computer or a workstation and to place them next to each other so as to effectively double the effective line width through the use of two monitors. As a result a user is able e.g. to assign Windows control windows to one monitor, while an application, such as e.g. a text processing, is represented on the other monitor. If a user wants to incorporate graphic images in a text processing, a system with two monitors enables him to perform a text processing on one monitor while on the second monitor a graphic image is manipulated and dimensioned so as to fit into the place reserved for it in a document which is being worked on. The same also applies e.g. to CAD applications, where there is a desire for a high-quality, high-resolution screen for the CAD application, whereas the control symbols on the other screen do not require the use of such a high-quality screen, thus enabling a saving in working place costs.

In order to control two or more monitors from a computer so as to double or more than double the effective line width, it is necessary to "distribute" the graphic data generated by the computer correctly to the individual screens. Among the devices for storing data to be represented on monitors are the so-called video random access memories or VRAMS, in which the data for display are addressed linewise. A line of a video random access memory can thus contain as many pixels as can be represented in one line on an assigned monitor, this line only having to be addressed with one address, however, as is known to persons skilled in the art.

In a known system for controlling two monitors, each monitor is equipped with its own digital-analog converter, which is needed to convert the digital data delivered by the computer into analog data required by the monitor. Furthermore, each digital-analog converter is connected to its own video random access memory, which is in turn controlled by its own graphics control. In a known system the data for display delivered by a computer are passed over a host bus to a buffer, undergoing a software-implemented image division on the way. The host CPU, i.e. the central processing unit of the host system, stores the data to be represented on the two monitors in video random access memories, one for each of the monitors, from which, by means of the graphics control provided for each video random access memory, data can be read out and converted into an analog form for display on the monitors. The known system thus comprises two parallel branches, a branch consisting of a monitor, a digital-analog converter, a video random access memory and a graphics control, the two branches being connected and controlled by a software image division unit, which is fed by the host bus of the computer via a data buffer, which may likewise be implemented as a VRAM. The host CPU must thus undertake the division of the pixel stream in this known system. The pixel stream to be represented on the monitors must thus be apportioned to the respective video random access memories by the software image division unit.

A disadvantage of the known system is that a separate video random access memory and a separate graphics control must be provided for each monitor, which means that a system of two monitors and a computer is unnecessarily costly. Furthermore, the software-implemented image division in the software image division unit is slow, meaning that the image buildup times of the system of two monitors are increased unnecessarily.

SUMMARY OF THE INVENTION

Starting from this prior art, it is the object of the present invention to provide an economic and fast way of controlling two monitors on the basis of an input-side pixel data stream.

In accordance with a first aspect of the present invention, this object is achieved by a method for controlling two monitors on the basis of an input-side pixel data stream, in which pixels for a line are arranged serially, wherein one part of each line of the input-side pixel data stream is displayed on one monitor and another part of the line is displayed on another monitor, comprising the steps of storing one part of the line of the input-side pixel data stream in one FIFO memory device without previous buffering; subsequent to the storing of the first part, storing the other part of the line of the input-side pixel data stream in another FIFO memory device without previous buffering; reading out one FIFO memory device with the pixel frequency with which one monitor is operated; and reading out the other FIFO memory device with the pixel frequency with which the other monitor is operated.

In accordance with a second aspect of the present invention, this object is achieved by a monitor control circuit for controlling two monitors on the basis of an input-side pixel data stream, in which pixels for a line are arranged serially, wherein one part of each line of the input-side pixel data stream is displayed on one monitor and another part of the line of the input-side pixel data stream is displayed on another monitor, comprising two FIFO memory devices; and a control device for controlling the storage of one part of the line of the input-side pixel data stream in one FIFO memory device without previous buffering, for controlling the storage of the other part of the line of the input-side pixel data stream in the other FIFO memory device without previous buffering and subsequent to the storing of the first part, for controlling the readout of one FIFO memory device with the pixel frequency with which one monitor is operated, and for controlling the readout of the other FIFO memory device with the pixel frequency with which the other monitor is operated.

The invention is based on the finding that it is possible to dispense with a separate video random access memory for each monitor by replacing each video random access memory with a fast and cheap FIFO memory device and FIFO control logic units circuited between two FIFOs. The operation of the FIFO memory devices for each monitor is controlled and synchronized through respective FIFO control logic units circuited between two FIFOs. In a preferred embodiment which employs VRAMS, the FIFO memory devices for each monitor are fed from a single VRAM frame buffer (i.e. image memory), which is in turn controlled by a graphics control. As a result only one frame buffer and one graphics control are needed to control all the monitors connected to a computer.

BRIEF DESCRIPTION OF THE DRAWINGS

A preferred embodiment of the present invention will be described in more detail below making reference to the enclosed drawings, in which.

DETAILED DESCRIPTION OF A PREFERRED EMBODIMENT

Figure 1:
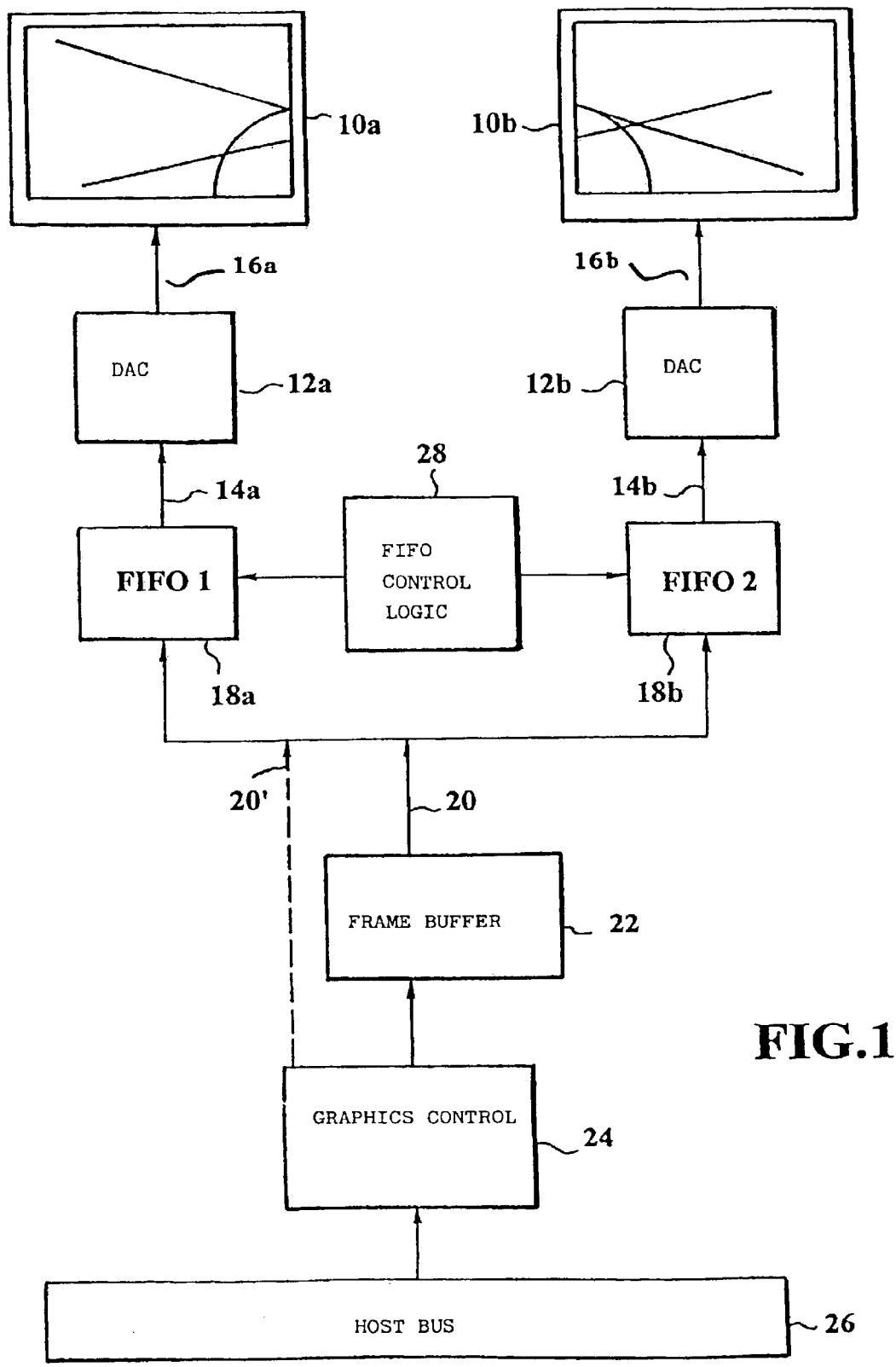
FIG. 1 shows an overview of a computer system with two monitors according to the present invention.

FIG. 1 shows an overview of a computer system for controlling two monitors 10a, 10b. In the preferred embodiment of the present invention which is shown in broad outline in FIG. 1 only two monitors 10a and 10b are controlled. However, from the description of the present invention it will be obvious to persons skilled in the art that a plurality of monitors which include the monitor 10a and the other monitor 10b can also be controlled. Each of the monitors 10a and 10b has a digital-analog converter, 12a and 12b respectively, assigned to it. The digital-analog converters 12a and 12b may either be integrated in the respective monitor, which is not customary, however, or they may be located externally, e.g. on a graphics card. The inputs to the digital-analog converters 12a and 12b are digital signals 14a and 14b respectively and in a preferred embodiment of the present invention they supply analog RGB signals 16a, 16b.

The digital-analog converter 12a is supplied from a first FIFO memory device 18a with pixel data to be represented on the monitor 1a, said pixel data forming part of the digital input signals 14a for the digital-analog converter 12a. In analogous fashion to this a second FIFO memory device 18b feeds the digital-analog converter 12b with digital pixel data to be displayed on the monitor 10b. The first and the second FIFO memory devices are supplied with pixel data from an input-side pixel data stream 20, said pixel data being fetched from a frame buffer 22, which in a preferred embodiment is a video random access memory (VRAM). A graphics control 24 receives the pixel data stream 20 created on the input side, together with timing control signals for the same, from a host bus 26, which is connected to a computer. It should be pointed out here that the overview in FIG. 1 shows only the apportioning of the input-side pixel data stream to the two monitors 10a and 10b, whereas no control signals are shown in FIG. 1.

As has already been mentioned, in a preferred embodiment of the present invention VRAMs are used, which constitute the frame buffer 22. In other preferred embodiments of the present invention in which DRAMs, SDRAMS, SGRAMS or WRAMs are used, the frame buffer 22 is not necessary since an input-side pixel data stream 20 can then be generated in the graphics control and fed directly into the two FIFO memory devices 18a, 18b, as is shown by the dashed line in FIG. 1. In the sense of the present invention it is thus possible to say that the input-side pixel data stream 20 is present at the inputs of the two FIFO memory devices 18a, 18b, said pixel data stream being apportioned accordingly to the first and the second monitors 10a and 10b. Correct apportioning of the pixel data stream 20 is controlled by a FIFO control logic 28, which is described in more detail in FIG. 2. The FIFO control logic 28 also supports the correct readout of the FIFO memory devices 18a and 18b.

Figure 2:
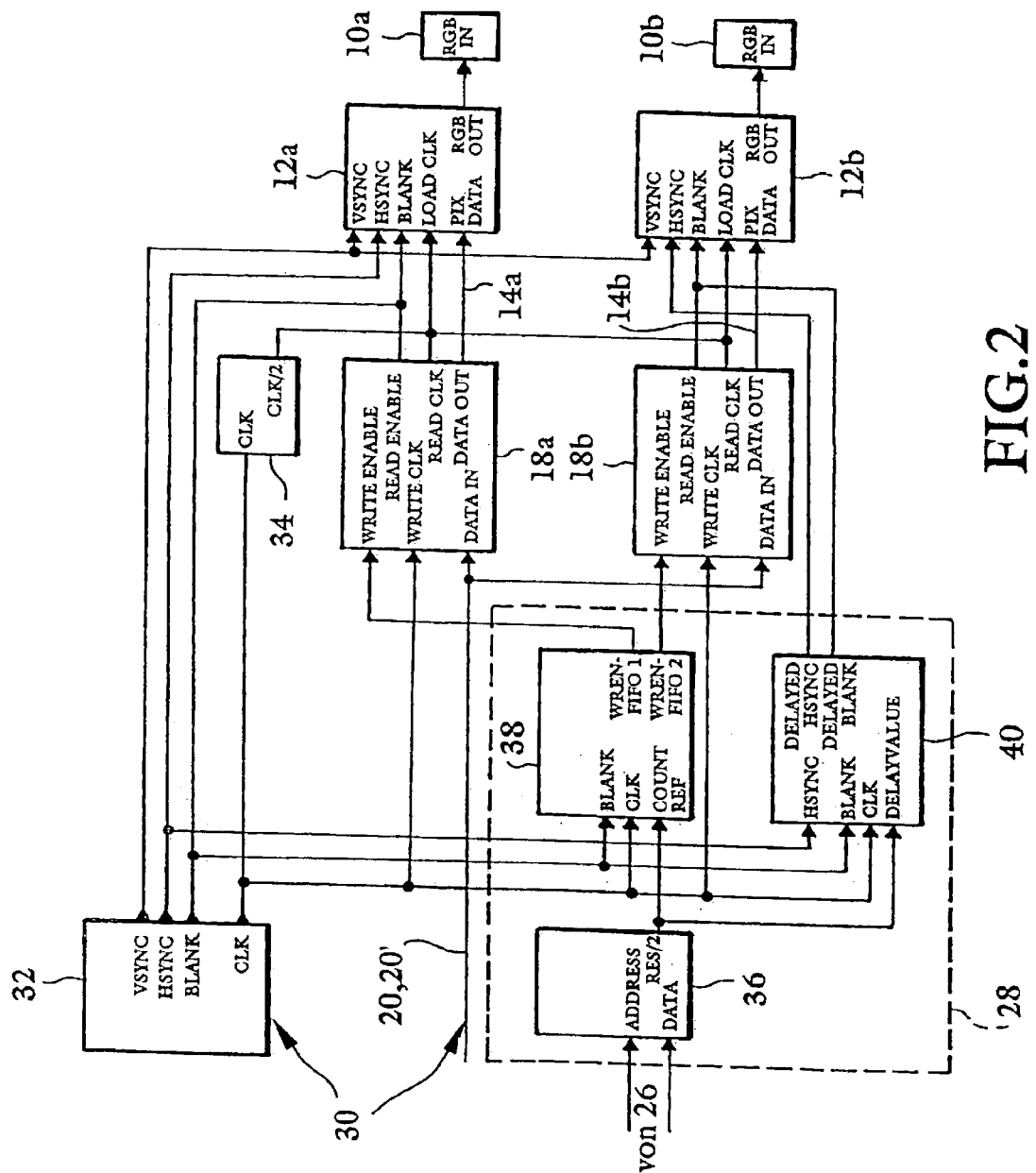
FIG. 2 shows a block diagram according to an embodiment of the present invention.

FIG. 2 shows a detailed block diagram of the overview in FIG. 1. The input-side pixel data stream 20 or 20' from the frame buffer 22 or from the graphics control 24 respectively is present both at the first and the second FIFO memory device. Both FIFO memory devices 18a and 18b have three inputs, WRITE ENABLE for a write enable signal, WRITE CLK for a write clock signal and DATA IN for the input-side pixel data stream. On the output side the first FIFO memory device and the second FIFO memory device have an output READ ENABLE for a read enable signal, an output READ CLK for a read clock signal and an output DATA OUT for the digital pixel signals 14a and 14b into the digital-analog converters 12a and 12b respectively. As has already been described in FIG. 1, the first FIFO memory device 18a is followed by the digital-analog converter 12a, which supplies the monitor 10a. In the same way the second FIFO memory device 18b is followed by the digital-analog converter 12b, which in turn supplies the other monitor 10b.

The first and the second FIFO memory devices 18a, 18b are controlled by a control 30, which encompasses a time generator 32, a frequency setting device 34 and also the FIFO control logic 28 already referred to in FIG. 1. The FIFO control logic 28 comprises a screen resolution register 36, a pixel counter 38 and a programmable delay unit 40. The screen resolution register 36 is in contact with the host bus 26 (FIG. 1), from which the screen resolution register receives specific data for the monitors 10a and 10b via an address input ADDRESS and via a data input DATA. These monitor-specific data comprise the complete line resolution of both monitors, i.e. the number of pixels in a line of one monitor 10a added to the number of pixels of a line of the other monitor 10b. In a preferred embodiment of the present invention the number of pixels of a line of one monitor 10a is the same as the number of pixels of a line of the other monitor 10b. A line of the input-side pixel data stream 20 thus has twice as many pixels as a line of a monitor 10a or 10b. One part of a line of the input-side pixel data stream 20 is consequently represented on the monitor 10a while the other part of the line of the input-side pixel data stream is represented on the other monitor 10b. In the embodiment described the two parts are of the same size and the two parts together constitute a line of the input-side pixel data stream 20. The present invention is also applicable to systems with more than two monitors, however, and also to systems in which the partial lines represented on monitors have a different number of pixels. Information on the number of monitors and on the number of pixels of a line of each monitor resides in the screen resolution register 36. As the preferred embodiment of the present invention features two monitors 10a and 10b having the same line resolution, a resolution signal is output via an output RES/2 with a value corresponding to half the resolution of the input-side pixel data stream 20, i.e. to the full resolution of the monitor 10a or 10b. The resolution signal is supplied to the pixel counter 38 as counter reference signal via an input COUNT REF. The pixel counter 38 also has inputs BLANK and CLK for a blanking signal and a clock signal respectively. On the output side the pixel counter 38 has two outputs WRENFIFO 1 and WRENFIFO 2 for sending a write enable signal to the first FIFO memory device 18a and a write enable signal to the second FIFO memory device 18b respectively. The programmable delay unit 40 has an input HSYNC for a horizontal synchronization signal, an input BLANK for a blanking signal, an input CLK for a clock signal and an input DELAY VALUE for a delay value signal from the screen resolution register 36. On the output side the programmable delay unit 40 has an output DELAYED HSYNC for a delayed horizontal synchronization signal and an output DELAYED BLANK for a delayed blanking signal.

The vertical synchronization signal, the blanking signal and the clock signal are created in a time generator 32, which is capable of extracting the control signals from the data stream which is transmitted from the host bus 26 to the graphics control 24 and which contains both the input-side pixel data stream 20 and control signals for the same. The time generator 32 can thus be an external unit or it can be integrated in the graphics control 24. In the preferred embodiment of the present invention the frequency setting device 34, which likewise forms part of the control 30, performs a divider function in order to create from the clock signal CLK a clock signal with half the frequency of the clock signal CLK, the frequency of the halved clock signal CLK/2 corresponding to the operating frequency of the monitors 10a and 10b.

The two digital-analog converters 12a, 12b are equipped, in a manner known to persons skilled in the art, with inputs VSYNC for the vertical synchronization signal, HSYNC for the horizontal synchronization signal, BLANK for the blanking signal, LOAD CLK for a load clock signal and an input PIX DATA for the pixel data to be converted to an analog form. On the output side the digital-analog converters 12a and 12b have an output RGB OUT for providing the respective input RGB IN of the monitors 10a and 10b with an RGB signal, as is known to persons skilled in the art.

Figure 3:
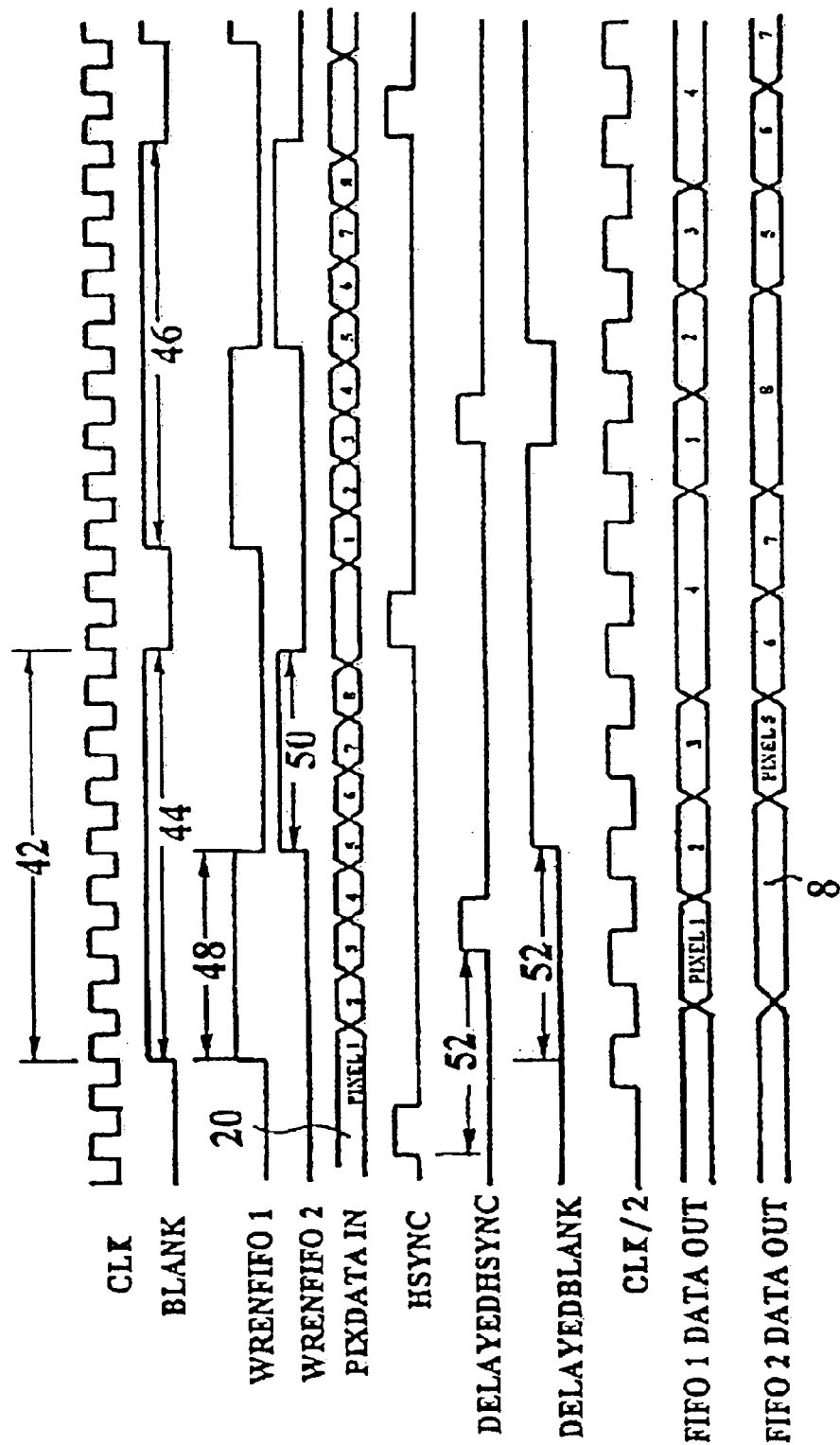
FIG. 3 shows a timing diagram for the block diagram from FIG. 2.

The functioning of the block diagram shown in FIG. 2 and described above will now be described making reference to FIG. 3. The clock signal CLK can have a clock frequency which conforms to any standard. In FIG. 3 a timing diagram for an active display time 42 of eight pixels is described. For persons skilled in the art it is obvious that the principle is applicable to all other display times, the restriction to an active display time of eight clock periods or eight pixels serving solely to clarify and simplify matters.

The input-side pixel data stream 20 thus has a line length of 8 pixels, the two monitors 10a and 10b each having a line width of four pixels. A line of the input-side pixel data stream is thus divided into one part with a length of four pixels and another part with the same length of four pixels.

The blanking signal BLANK is known to persons skilled in the art and in its logical high state it activates the digital-analog converter 12a, which is assigned to the monitor 10a. The blanking signal BLANK thus defines the active display time 42, there being a pause of 2 periods of the clock signal CLK, in which the known horizontal synchronization signal HSYNC goes into the high state for the duration of one clock period, between a first displayed line and a second displayed line 46. The signal WRENFIFO1 makes it possible to write into the first FIFO memory device 18a for a part 48 of a line of the input-side pixel data stream 20, while the write enable signal for the second FIFO memory device WRENFIFO2 enables the second FIFO memory device 18b for another part 50 of a line of the input-side pixel data stream 20. The effect of the phase displacement of the two signals WRENFIFO1 and WRENFIFO2 by 180° is that the first four pixels of a line of the input-side pixel data stream 20 are clocked into the first FIFO memory device 18a and the next four pixels, i.e. the pixels 5 to 8, are clocked into the second FIFO memory device 18b. The clock speed for writing into the FIFO memory devices 18a and 18b corresponds to the frequency of the clock signal CLK, it being important to note at this point that the system according to the present invention does not require a buffer of any kind and that the FIFO memory devices 18a and 18b serve to apportion the input-side pixel data stream to the available monitors.

The write enable signals for the two FIFO memory devices 18a and 18b are created by the pixel counter 38, which may be a binary counter, which is set to a value of 4 by a counter reference signal at its input COUNT REF and which, during the time period following a rising flank of the blanking signal BLANK, outputs the signal WRENFIFO1 and which, during its second counting period after a rising flank of the blanking signal BLANK, creates the signal WRENFIFO2.

As has already been mentioned, buffering does not occur, which is why the two FIFO memory devices 18a and 18b are read from with half the clock frequency, generated in the frequency setting device 34, with which the pixels now distributed to the two monitors arrive in their digital-analog converters 12a, 12b. Alternatively, a small number of clock periods may elapse before the read data are valid.

An example will now be considered in which a line consists of eight pixels, of which four pixels are to be sent for display to the monitor 10a and the other four pixels are to be sent for display to the monitor 10b. As may be seen from the last two lines of FIG. 3, the readout occurs in such a way that at the same time as the first pixel of a line is being read out of the first FIFO memory device 18a the last pixel of the previous line can be read out of the second FIFO memory device 18b. When the second pixel of a line is being read out of the first FIFO memory device 18a, the other monitor 10b is blanked, whereas when the third pixel of a line is being read out of the first FIFO memory device 18a, the fifth pixel of the same line is read out of the FIFO memory device 18b. Readout of the fourth pixel of a line from the first FIFO memory device 18a takes place simultaneously with the readout of the sixth pixel of the line of the input-side pixel data stream 20 from the second FIFO memory device 18b. During readout of the seventh pixel of the line from the second FIFO memory device 18b, no pixel is read out of the first FIFO memory device 18a, in order to blank the monitor 10a. The blanking of the monitor 10a is controlled by the horizontal synchronization signal HSYNC and by the blanking signal BLANK, while the blanking of the other monitor 10b is controlled by the delayed horizontal synchronization signal DELAYED HSYNC and by the delayed blanking signal DELAYED BLANK. Both delayed signals are each delayed by half 52 the active display time 42 relative to their undelayed signals.

From the above example of a line with eight pixels it is clear how the readout occurs for lines having more than eight pixels. It should be noted, however, that in a preferred embodiment of the present invention the FIFO 18b is not read out until one half of a line for display has been stored in the FIFO 18a.

By providing FIFO memory devices which are deeper than four pixels, it is in principle possible to set the time shift between the readouts from the two FIFO memory devices 18a and 18b to any value; however, the situation which has been described represents the most economical one since it is not possible to read out pixel 5 of a line of the input-side pixel data stream 20 prior to this occurring in parallel to the readout of pixel 3 of the same line since it is not, as can be seen from the timing diagram in FIG. 3, available beforehand.

What is claimed is:

1. A method for controlling two monitors on the basis of an input-side pixel data stream, in which pixels for a line are arranged serially, wherein one part of each line of the input-side pixel data stream is displayed on one monitor and another part of the line is displayed on another monitor, comprising the following steps:

storing one part of the line of the input-side pixel data stream in one FIFO memory device without previous buffering;

subsequent to the storing of the first part, storing the other part of the line of the input-side pixel data stream in another FIFO memory device without previous buffering;

reading out one FIFO memory device with the pixel frequency with which one monitor is operated; and reading out the other FIFO memory device with its pixel frequency with which the other monitor is operated.

2. A method according to claim 1, with the following additional step:

creating timing control signals for controlling the monitors on the basis of timing control signals of the input-side pixel data stream.

3. A method according to claim 1, with the following additional step:

delaying timing control signals of the input-side pixel data stream, whereby one of the monitors is controlled with a time delay and in synchronism with the other monitor.

4. A method according to claim 1, wherein one part of each line of the input-side pixel data stream and the other part of each line of the input-side pixel data stream are of the same size and together have the length of a line of the input-side pixel data stream.

5. A method according to claim 4, having the following additional steps:

setting a counter reference value to the number of pixels of one part of each line of the input-side pixel data stream; and counting the pixels of each line of the input-side pixel data stream by counting the pulses of a clock with which the input-side pixel data stream is stored in each of the FIFO memory devices.

6. A method according to claim 5, with the following additional steps:

enabling the storage of one part of the line of the input-side pixel data stream in one FIFO memory device and blocking storage in the other FIFO memory device before reaching the counter reference value and after the appearance of a blanking signal; and enabling the storage of the other part of the line of the input-side pixel data stream in one FIFO memory device and blocking storage in the other FIFO memory device after reaching the counter reference value and after the appearance of the blanking signal.

7. A method according to claim 6, with the following additional steps:

setting the pixel frequency of each monitor to half the clock frequency;

halving the frequency of the clock signal;

reading out one FIFO memory device with the halved clock frequency on appearance of the blanking signal;

delaying the blanking signal by a time which is equal to the number of pixels of one part of the line of the input-side pixel data stream multiplied by the period duration of the clock signal; and reading out the other FIFO memory device on appearance of the delayed blanking signal in such a way that both FIFO memory devices are read out in synchronism and with a time shift.

8. A method according to claim 4, with the following additional steps:

detecting a horizontal synchronization signal in the input-side pixel data stream;

delaying the horizontal synchronization signal by a time which is equal to the number of pixels of one part of the line of the input-side pixel data stream multiplied by the period duration of the clock signal; and reading out the other FIFO memory device after the appearance of the delayed horizontal synchronization signal in such a way that both FIFO memory devices are read out in synchronism and with a time shift.

9. A method according to claim 1, wherein the pixel frequency with which on monitor is operated and the pixel frequency with which the other monitor is operated together amount to the clock frequency with which one part of the line of the input-side pixel data stream is stored in one FIFO memory device and the other part of the line of the input-side pixel data stream is stored in the second FIFO memory device.

10. A monitor control circuit for controlling two monitors on the basis of an input-side pixel data stream, in which pixels for a line are arranged serially, wherein one part of each line of the input-side pixel data stream is displayed on one monitor and another part of the line of the input-side pixel data stream is displayed on another monitor, comprising:

two FIFO memory devices; and a control device for controlling the storage of one part of the line of the input-side pixel data stream in one FIFO memory device without previous buffering, for controlling the storage of the other part of the line of the input-side pixel data stream in the other FIFO memory device without previous buffering and subsequent to the storing of the first part, for controlling the readout of one FIFO memory device with the pixel frequency with which one monitor is operated, and for controlling the readout of the other FIFO memory device with the pixel frequency with which the other monitor is operated.

11. A monitor control circuit according to claim 10, wherein the control includes a time generator which creates timing control signals for controlling the monitors on the basis of timing control signals of the input-side pixel data stream and which is also connected to a frequency setting device for setting the pixel frequencies with which the monitors are operated so as to take account of the pixel frequency of the input-side pixel data stream.

12. A monitor control circuit according to claim 11, wherein the control also includes a FIFO control logic, the FIFO control logic comprising:

a screen resolution register, which can be connected to a host bus of a computer and which supplies length values of one part and of the other part of the line of the input-side pixel data stream in response to control signals from the computer;

a pixel counter, which can be connected to the time generator and which creates FIFO control signals for controlling the two FIFO memory devices on the basis of the timing control signals of the input-side pixel data stream; and a programmable delay unit, which creates delayed control signals for controlling one of the monitors on the basis of timing control signals and on the basis of the lengths of the two parts of the line of the input-side pixel data stream.

* * * * *